United States Patent [19]

Carman et al.

[11] 4,046,840
[45] Sept. 6, 1977

[54] THERMOPLASTIC POLYMER BLENDS OF AN EPDM POLYMER HAVING A HIGH ETHYLENE LENGTH INDEX WITH POLYETHYLENE

[75] Inventors: Charles Jerry Carman, Stow; Martin Batiuk, Grafton; Richard Michael Herman, Elyria, all of Ohio

[73] Assignee: The B. F. Goodrich Company, Akron, Ohio

[21] Appl. No.: 660,319

[22] Filed: Feb. 23, 1976

[51] Int. Cl.$^2$ ............................................. C08L 23/16
[52] U.S. Cl. .................................................. 260/897 A
[58] Field of Search ..................................... 260/897 A

[56] References Cited

U.S. PATENT DOCUMENTS

| 3,646,169 | 2/1972 | Wirth | 260/889 |
| 3,806,558 | 4/1974 | Fischer | 260/897 |
| 3,835,201 | 9/1974 | Fischer | 260/897 |
| 3,946,897 | 3/1976 | Wolff | 220/306 |

*Primary Examiner*—Carman J. Seccuro
*Attorney, Agent, or Firm*—Alan A. Csontos

[57] ABSTRACT

EPDM polymers having a high ethylene length index (ELI) are physically blended with polyethylene polymers. The blends exhibit superior tensile strength, significantly better than that predicted from their additive individual effects. The thermoplastic polymer blends are useful to prepare molded products, tubing, liners, and like products.

7 Claims, No Drawings

THERMOPLASTIC POLYMER BLENDS OF AN EPDM POLYMER HAVING A HIGH ETHYLENE LENGTH INDEX WITH POLYETHYLENE

BACKGROUND OF THE INVENTION

Polymer blends of ethylene-propylene-diene (EPDM) polymers with poly-α-monoolefin polymers, particularly with polyethylene, are known to the art (see U.S. Pat. Nos. 3,176,052; 3,328,486; 3,361,850; and 3,751,521; and Canadian Pat. No. 798,416). Such blends are useful to prepare a broad range of molded products such as tubing, toys, and household and automotive items. For many applications, the item must have high structural integrity and good tensile strength. Unfortunately, polymer blends of EPDM polymers with polyethylene often exhibit low tensile strength.

To achieve higher tensile strengths, curing or crosslinking agents have been added to such polymer blends to effect chemical changes in the blend (see U.S. Pat. Nos. 3,256,366; 3,564,080; 3,758,643; and 3,806,558). For example, polymer blends described in U.S. Pat. Nos. 3,785,643 and 3,806,558, which are stated to be thermoplastic in nature, are prepared by partially crosslinking the polymers, particularly the EPDM polymers. The polymer blends of the present invention, i.e., physical blends of EPDM polymers having a high ethylene length index (ELI) and polyethylene (PE) polymers, are thermoplastic in nature, yet do not use curing or crosslinking agents in their preparation. Additionally, the tensile strengths of the polymer blends of the invention are far superior to that predicted from the additive individual effects of the polymer components.

Reference is made to commonly assigned U.S. Pat. No. 3,919,358 which discloses thermoplastic polymer blends of (1) an EPDM polymer having a high degree of unstretched crystallinity with (2) polyethylene. The unstretched crystalline content of the EPDM polymer employed therein was between about 10 percent and about 20 percent as determined by an X-ray diffraction technique. Unexpectedly, it has now been discovered that an EPDM polymer having little or no unstretched crystallinity, but having a high ethylene length index (ELI) can be advantageously used with polyethylene to prepare thermoplastic polymer blends that exhibit superior tensile strengths.

SUMMARY OF THE INVENTION

Thermoplastic polymer blends comprising (1) an ethylene-propylene-diene (EPDM) polymer having little or no unstretched crystallinity and having an ethylene content of at least about 65 percent by weight, a melt endotherm value of from about 1 to about 10 calories per gram, and an ethylene length index (ELI) of greater than 2.7, which is a measure of ethylene units in runs of three or more to total carbon in the polymer as determined by Carbon-13 NMR, and (2) a polyethylene (PE) polymer are prepared by physically mixing the polymer components under heat and shear conditions. The thermoplastic blends exhibit tensile strengths of at least about 200 psi greater than that predicted from each polymer's individual contributive effect. No curing or crosslinking agents are used to obtain the superior tensile strengths of the thermoplastic blend.

DETAILED DESCRIPTION OF THE INVENTION

The thermoplastic polymer blends of this invention comprise a physical mixture of two polymer components, i.e., an ethylene-propylene-diene (EPDM) polymer and a polyethylene (PE) polymer. The polymers are mixed in a range of from about 5 parts by weight to about 200 parts by weight of PE per 100 parts by weight of EPDM polymer. The use of over 200 parts of PE per 100 parts of EPDM in the polymer blend is not necessary to achieve the advantages of the present invention. Excellent results are obtained when the polyethylene polymer is admixed in a range of from about 25 parts to about 150 parts of PE per 100 parts of EPDM.

The polymer blends are truly thermoplastic, exhibiting excellent strength and structural stability at ambient temperature but easily processable at temperatures above 140° C. A smooth roll is formed in milling operations, and the blends are readily extrudable and moldable, having good flow properties. Formed items made from the blends are reprocessable. In contrast to the thermoplastic blends disclosed in U.S. Pat. Nos. 3,785,643 and 3,806,558, the polymer blends of the present invention do not use curing or crosslinking agents to effect partial cure of the polymer components in order to achieve superior tensile strengths. However, also in contrast to other known thermoplastic blends employing an EPDM polymer, the EPDM polymers used in the present invention are unique in having a high ethylene length index (ELI), which index is a measurable property of the polymer. Other properties of the unique EPDM polymer used in the invention are disclosed in the following discussion.

The EPDM polymers employed in the blends consist essentially of interpolymerized units of about 65 percent to about 85 percent by weight of ethylene, about 5 percent to about 35 percent by weight of propylene, and from about 0.2 percent to about 15 percent by weight of a diene monomer. More preferably, the polymers consist essentially of from about 67 percent to about 75 percent by weight of ethylene, about 15 percent to about 30 percent by weight of propylene and from about 0.5 percent to about 10 percent by weight of a diene monomer. Examples of the diene monomers which can be used are: conjugated dienes such as isoprene, butadiene, and the like; and nonconjugated dienes, containing from 5 to about 25 carbon atoms, such as 1,4-pentadiene, 1,4-hexadiene, 1,5-hexadiene, 2,5-dimethyl-1,5-hexadiene, 1,4-octadiene, and the like; cyclic dienes such as cyclopentadiene, cyclohexadiene, cyclooctadiene, dicyclopentadiene, and the like; vinyl cyclic enes such as 1-vinyl-1-cyclopentene, 1-vinyl-1-cyclohexene, and the like; alkylbicyclononadienes such as 3-methylbicyclo-(4,2,1) nona-3,7-diene, 3-ethyl-bicyclonondiene, and the like; indenes such as methyl tetrahydroindene, and the like; alkenyl norbornenes such as 5-ethylidene-2-norbornene, 5-butylidene-2-norbornene, 2-methallyl-5-norbornene, 2-isopropenyl-5-norbornene, 5-(1,5-hexadienyl)-2-norbornene, 5-(3,7-octadienyl)-2-norbornene, and the like; and tricyclo dienes such as 3-methyl-tricyclo(5,2,1,0$^{2,6}$)-3,8-decadiene, and the like. The more preferred dienes are the nonconjugated diene monomers containing from 5 to about 25 carbon atoms. Particularly good results are obtained when alkenyl norbornenes are used as the diene monomer. The EPDM polymers are readily prepared using polymerization techniques known to the art such as described in U.S. Pat. No. 3,646,169, and in articles by G. Crespi et al in Hydrocarbon Processing, February (1969), pgs. 103-107 and by S. Cessa et al in LaChimica e L'Industria, Vol. 50, No. 12, (1968), pgs. 1299-1306.

The EPDM polymers employed also exhibit a melt endotherm of from about 1 to about 10 calories/gram, and more preferably from about 1 to about 6 calories/gram. The melt endotherm is measured using a differential scanning calorimeter (DSC) such as that sold by the Perkin Elmer Company as the Perkin Elmer DSC-2. The test measures heat of fusion within the polymer. A sample of polymer of known weight, which has been annealed at room temperature for at least 24 hours, is placed in a closed aluminum pan (DSC cell calorimeter pans were used). The polymer sample is then heated at a rate of 10° C./minute over a temperature range of from −103° C. to +107° C. The DSC chart is precalibrated, using metals with known heats of fusion, to provide a chart having a unit area in terms of calories/square inch/minute. As the polymer sample is heated, a crystalline melt point peak will show on the chart. The area under the crystalline melt point peak is measured, and the melt endotherm in calories/gram is calculated from the area obtained. Two melt endotherm measurements can be obtained from one test, i.e., a measurement on heating the sample and a measurement on cooling down the sample.

The ethylene-propylene-diene (EPDM) polymers employed also have low unstretched crystallinity, ranging from 0 percent to about 8 percent based upon the polymer. More preferably, the EPDM polymer has an unstretched crystallinity of up to 6 percent of the EPDM polymer. The unstretched crystallinity of the EPDM polymer is measured using an X-ray technique. Measuring percent crystallinity in polymers via X-ray diffraction is a known technique (see Natta et al, Atti Accad-Nazi. Lincei. Rend. (8) 8 11 (1957)). The method used herein consisted of pressing a 0.020 inch thick film of the EPDM polymer at 120° C. and 20,000 pounds pressure. The films were quickly cooled (quenched) and then annealed at room temperature for at least 24 hours. The thin films are then mounted and exposed to X-rays, and a diffraction scan is made across an angular range. Using a diffractometer, a plot of the angular distribution of the radiation scattered by the film is made. This plot is seen as a diffraction pattern of sharp crystalline peaks superimposed upon an amorphous peak. The quantitative value of percent crystallinity is obtained by dividing the crystalline diffraction area of the plot by the total diffraction area on the plot.

A unique property of the EPDM polymers employed in the blends with the polyethylene polymer is its high ethylene length index (ELI). This ethylene length index is a measurable value and is proportional to the ratio of interpolymerized ethylene units in the polymer in runs of three or more units of ethylene to the total carbon in the polymer. The ELI is determined using Carbon-13 Nuclear Magnetic Resonance (NMR) spectroscopy and employing recently developed techniques to determine monomer sequencing. These techniques are described and published in the Journal of Polymer Science:Symposium No. 43 (1973), pages 237 to 250 and by C. Carman et al in Rubber Chemistry and Technology, Vol. 44, No. 3 (1971), pages 781 to 804, and Macromolecules, Vol. 7 (1974), pages 789 to 793. The Carbon-13 spectrum for each EPDM polymer sample was obtained using standard Fourier transform pulsed NMR techniques employing the following parameters: sweep width of 6000 Hz., 16 K data points, 90° pulse angle of less than 16 μ sec. pulse width, 5 second repetition rate, and at least 1000 transients and a line broadening of 1.5 Hz. The instrument used was a Bruker pulsed Fourier transform NMR Model HX90E operating at 22.63 MHz. The EPDM polymers were prepared as 10 percent or 20 percent weight per volume solutions in trichlorobenzene and the spectra obtained at 120° C. or above. The ethylene length index is determined by measuring the ratio of the peak intensity of the Carbon-13 resonance at 28 ppm (relative to an internal reference of hexamethyl disiloxane) to the total carbon resonance area of the polymer as evidenced in the NMR spectra. The total carbon resonance area is the plotted integral of the absorption, where the vertical scale of the integral is the same as that used for the absorption and the Bruker integration scale is set at six. The EPDM polymers used in the polymer blends of the invention have an ethylene length index (ELI) of greater than 2.7/1, and more preferably from about 2.8/1 to about 5/1.

The EPDM polymers are high molecular weight elastomers. They have a dilute solution viscosity (DSV) of about 1.3 to about 4.5 measured at 25° C. as a solution of 0.1 gram of polymer per deciliter of toluene. The raw polymer has a tensile strength of about 300 psi minimum to about 1800 psi, and more typically, from about 600 psi to about 1600 psi, and an elongation at break of at least about 600 percent.

The polyethylene employed in the blend can be a low (to about 0.94 gram/cc.) density, medium (about 0.94 gram/cc. to about 0.96 gram/cc.) density, or high (above about 0.96 gram/cc.) density polyethylene. The low density polyethylenes are preferred as they provide actual tensile reinforcement between the polymers. The polyethylenes have a melt index of from about 0.2 gram/10 minutes to about 30 grams/10 minutes measured at 190° C. under a 2.16 kilogram load. If a low density polyethylene is used, the melt index of the polyethylene is preferably below 7 grams/10 minutes. The polyethylenes are commercially available, and can be readily prepared using standard polymerization techniques known to the art. As mentioned before, the polyethylene is used at from about 5 parts to about 200 parts by weight with 100 parts by weight of the EPDM polymer. Particularly good results are obtained when the PE is used at about 25 parts to about 150 parts by weight with 100 parts by weight of EPDM polymer.

The composition of the invention comprises a physical blend of the EPDM polymer and polyethylene (PE) polymer. No cure or crosslinking agents are employed. It was totally unexpected that the thermoplastic polymer blend of the two polymeric components would exhibit a tensile strength substantially greater than that predicted from the additive individual effects of any one component alone. Prior to this invention, the classic behavior of uncured polymer blends is that tensile strengths of the blend would be lower than the additive individual effects of each polymer.

Tensile strengths of the blends were determined following ASTM procedure D412 (using a pull rate of 20 inches/minute). Predicted tensile strengths of the blends are calculated by assuming a purely additive relationship between the tensile strengths of the EPDM polymer and PE polymer used. The predicted tensile strength is the tensile strength indicated on a straight line drawn between the tensile strengths of the EPDM polymer and the PE polymer on a plot with tensile strength as the ordinate and the weight percent of PE in the blend as the abscissa. For example, if the EPDM polymer has a tensile strength of 990 psi and the PE has a tensile strength of 1880 psi, on a plot of tensile strength versus weight percent of PE in the polymer blend from 0 percent to 100 percent, a straight line is drawn from 990 to 1880. At the point on the abscissa indicating the weight percent of PE in the blend, a perpendicular line is drawn to intersect the straight line on the plot. The point of intersection indicates the predicted tensile strength of the particular polymer blend. An actual measured tensile strength which is greater than the predicted tensile strength shows synergistic behavior. For purposes of this application, the difference in psi between the actual measured tensile strength and the predicted tensile strength is called Δ Tensile. The thermoplastic polymer blends of the invention exhibit Δ Tensile of at least about 200 psi.

The polymer blends are truly thermoplastic, i.e., moldable and remoldable at temperatures of above 140° C., preferably at temperatures above 160° to about 200° C. and yet having a strong, flexible plastic nature at room temperatures.

A wide range of rubber and plastic compounding ingredients are readily mixed with the thermoplastic polymer blends using mixing equipment such as two-roll mills, extruders, banbury mixers, and the like. Standard mixing and addition techniques are used. Examples of compounding ingredients which can be used are metal oxides like zinc, calcium, and magnesium oxide, lead monoxide and dioxide, fatty acids such as stearic and lauric acid, and salts thereof such as cadmium, zinc and copper stearate and lead oleate; fillers such as the carbon blacks like channel blacks, high reinforcing blacks as N110 and N330, low reinforcing blacks as N550 and N770, and thermal blacks as N880 and N990, calcium and magnesium carbonates, calcium and barium sulfates, aluminum silicates, phenol-formaldehyde and polystyrene resins, asbestos, and the like; plasticizers and extenders such as dialkyl and diaryl organic acids like diisobutyl, diisooctyl, diisodecyl, and dibenzyl oleates, stearates, sebacates, azelates, phthalates, and the like; ASTM type 2 petroleum oils, ASTM D2226 aromatic, naphthalenic and paraffinic oils, castor oil, tall oil, glycerin, and the like; antioxidants, antiozonants, and stabilizers such as di-β-naphthyl-p-phenylenediamine, phenyl-β-naphthylamine, dioctyl-p-phenylenediamine, N-1,3-dimethylbutyl-N-phenyl-p-phenylenediamine, 4-isopropylamino diphenylamine, 2,6-di-t-butyl paracresol, 2,2'-methylenebis(4-ethyl-6-t-butyl phenol), 2,2'-thiobis-(4-methyl-6-t-butyl phenol), bisphenol-2,2'-methylenebis-6-t-butyl-4-ethylphenol, 4,4'-butylidenebis-(6-t-butyl-m-cresol), 2-(4-hydroxy-3,5-t-butylaniline)-4,6-bis(octylthio)-1,3,5-triazine, hexahydro-1,3,5-tris-β-(3,5-di-t-butyl-4-hydroxyphenyl)-propionyl-s-triazine, tris-(3,5-di-t-butyl-4-hydroxybenzyl)isocyanurate, tetrakismethylene-3-(3',5'-di-t-butyl-4'-hydroxyphenyl)propionate methane, distearyl thiodipropionate, dilauryl thiodipropionate, tri(nonylatedphenyl)phosphite, and the like; and other ingredients such as pigments, tackifiers, flame retardants, fungicides, and the like. Such ingredients can be used in levels well known to those skilled in the art.

Applications for the thermoplastic polymer blends include tubing, liners, wire and cable insulation, mats, and molded items such as shoe soles, toys, kitchen ware, and the like.

The blends were evaluated for their stress-strain properties, i.e., tensile, modulus, and elongation, following ASTM procedure D412 (using a pull rate of 20 inches/minute).

The following examples are presented to further illustrate the invention. Unless otherwise stated, the ingredients recited in the recipes are used in parts by weight.

EXAMPLES

The polymeric components of the blends, along with compounding ingredients, if used, were mixed together using a two-roll mill. The roll ratio was 1.2 to 1 and the front roll had a roll speed of 21 rpm. Roll temperature was about 162° C. The EPDM was banded on the mill and the polyethylene and compounding ingredients (if used) added to the banded polymer. Total mill time was about 5 minutes.

The mixing conditions and temperatures outlined above were employed to get uniform dispersion of the polymers and ingredients in the thermoplastic blend. This can be accomplished using other equipment, such as a banbury mixer, by mixing at other temperatures and for other times, and the like; all of which conditions and procedures are well known to the artisan. The above conditions were used to achieve good, thorough mixing, and are outlined to illustrate the preparation of the physical blends of the Examples.

EXAMPLE I

An EPDM polymer of the invention was mixed with a low density polyethylene polymer (NA301 sold by USI Chemicals) and the resulting thermoplastic blend evaluated for its tensile strength and elongation. For comparative purposes, other EPDM polymers were also mixed with the same PE polymer and the blends evaluated. The PE polymer used has a density of 0.92 g/cc., a melt index at 190° C. of 1.28 g./10 minutes and an average tensile strength of 1880 psi and an elongation of 650 percent. The EPDM polymers employed are identified as follows:

| EPDM Polymer | Tensile Strength (psi) | Melt Endotherm (cal./gram) | Percent Unstretched Crystallinity | Weight Percent Monomers | | | Ethylene Length Index (Ratio of Runs Of 3 or More Ethylene Units/Total Carbon) |
| --- | --- | --- | --- | --- | --- | --- | --- |
| | | | | Ethylene | Propylene | Diene | |
| EPDM-1 | 990 | 4.3 | 4 | 69 | 27 | 4[a] | 3.5/1 |
| EPDM-2 | 260 | 1.5 | 0 | 69 | 23 | 8[a] | 2.8/1 |
| EPDM-3 | 850 | 3.9 | 4 | 72 | 24 | 4[a] | 2.8/1 |
| EPDM-4 | 640 | 2.4 | 0 | 67 | 29 | 4[a] | 3.4/1 |
| EPDM-5 | 1160 | 4.6 | 5 | 73 | 23 | 4[c] | 3.5/1 |
| EPDM-6 | 260 | 1.0 | 5 | 64 | 29 | 7[b] | 1.8/1 |
| EPDM-7 | 1000 | 2.0 | 5 | 66 | 29 | 5[a] | 2.2/1 |
| EPDM-8 | 1650 | 5.8 | 11 | 69 | 27 | 4[a] | 2.6/1 |

[a]5-ethylidene-2-norbornene
[b]dicyclopentadiene
[c]1,4-hexadiene

The EPDM polymers and PE polymer were blended together using a two-roll mill operating at a roll temperature of about 160° C. The polymers were mixed together for a total of about 5 minutes, sheeted off of the mill and pressed in a tensile mold to prepare samples for tensile measurements.

Tensile strengths of the blends were determined following ASTM procedure D412. Predicted tensile strengths of the blends were calculated by assuming a purely additive relationship between the tensile strengths of the EPDM polymer and PE polymer used. The predicted tensile is that tensile strength indicated on a straight line drawn between the tensile strengths of the EPDM polymer and the PE polymer on a plot with tensile strength as the ordinate and the weight percent of PE in the blend as the abscissa. For example, in sample 1, the EPDM polymer had an average tensile strength of 990 psi and the PE had an average tensile strength of 1,880 psi. On a plot of tensile strength versus weight percent of PE in the polymer blend from 0 percent to 100 percent, a straight line was drawn from 990 to 1,880. At the point on the abscissa indicating 33 weight percent of PE in the blend, a perpendicular line was drawn to intersect the straight line on the plot. The point of intersection indicates the predicted additive tensile strength of the polymer blend, in this case 1280 psi. An actual measured tensile strength which is greater than the predicted tensile strength shows synergistic behavior.

The data shows that samples 1 to 5, thermoplastic polymer blends of the invention, have excellent tensile strengths. The measured tensile strengths of these blends are unexpectedly superior to that predicted from each polymer's individual contributive effect. The Δ Tensile for samples 1 to 5 is at least 200 psi, which is much superior to that exhibited for samples 6 to 8, polymer blends containing EPDM polymers without the scope of the invention.

higher than the tensile strength of any one polymer component alone.

The EPDM polymer used had a raw polymer tensile strength of 1,080 psi, an elongation of 770 percent, a melt endotherm value of 5.3 calories per gram, a percent unstretched crystallinity of 5 percent, an ethylene length index (ELI) of 3.6, and was comprised of interpolymerized units of about 69% by weight of ethylene, about 27% by weight of propylene, and about 4% by weight of 5-ethylidene-2-norbornene.

The PE polymer used was a low density (0.92 gram/cc.) polyethylene having a tensile strength of 1,870 psi and an elongation of 500 percent.

|  | 1 | 2 | 3 | 4 | 5 | 6 | 7 |
|---|---|---|---|---|---|---|---|
| EPDM Polymer | 100 | 100 | 100 | 100 | 100 | 100 | 100 |
| PE Polymer | 5 | 10 | 25 | 50 | 75 | 100 | 150 |
| Tensile Strength, psi | 1420 | 1490 | 2380 | 2300 | 2300 | 2100 | 2130 |
| Elongation, percent | 800 | 740 | 780 | 760 | 750 | 720 | 730 |
| Predicted Tensile Strength, psi | 1110 | 1140 | 1230 | 1340 | 1420 | 1480 | 1560 |
| Δ Tensile, psi | 310 | 350 | 1150 | 960 | 880 | 620 | 570 |

EXAMPLE III

A thermoplastic polymer blend was prepared following the procedure given in the previous examples. The EPDM polymer used was the same as employed in Example II. The PE polymer used was a medium density (0.95 gram/cc.) polyethylene polymer having a tensile strength of 3,800 psi, an elongation of about 60 percent, and a melt index of 0.23 gram/10 minutes. The PE polymer is sold commercially as PE-LB 733.

The EPDM and PE polymers were admixed at a level of 10 parts by weight of PE per 100 parts by weight of EPDM polymer. The measured tensile srength of the blend was 1,850 psi. The predicted tensile strength of the blend was 1,330 psi. Hence, the Δ Tensile of the

|  | 1 | 2 | 3 | 4 | 5 | 6 | 7 | 8 |
|---|---|---|---|---|---|---|---|---|
| EPDM-1 | 100 | | | | | | | |
| EPDM-2 | | 100 | | | | | | |
| EPDM-3 | | | 100 | | | | | |
| EPDM-4 | | | | 100 | | | | |
| EPDM-5 | | | | | 100 | | | |
| EPDM-6 | | | | | | 100 | | |
| EPDM-7 | | | | | | | 100 | |
| EPDM-8 | | | | | | | | 100 |
| PE | 50 | 50 | 50 | 50 | 50 | 50 | 50 | 50 |
| Tensile Strength, psi | 2030 | 1520 | 2190 | 2130 | 1640 | 850 | 1300 | 1610 |
| Predicted Tensile Strength, psi | 1280 | 790 | 1190 | 1050 | 1400 | 790 | 1290 | 1740 |
| Δ Tensile, psi | +750 | +730 | +1000 | +1080 | +240 | +60 | +10 | −130 |

EXAMPLE II

An EPDM polymer of the invention was blended with PE polymer at various levels of PE polymer to EPDM polymer. The two polymers were mixed for 5 minutes using a two-roll mill operating at 320° F. (160° C.). The data shows that the resulting thermoplastic blends exhibited excellent tensile strengths which were unexpectedly superior to their predicted tensile strengths. The data further shows that, generally, the use of between about 25 parts by weight to about 150 parts by weight of PE per 100 parts by weight of EPDM polymer results in optimum tensile strengths of the blend. Note that the use of 25 parts by weight or above of PE polymer in the blend resulted in measured tensile strengths of the blends which were actually blend was 520 psi, well over the level (Δ Tensile of 200 psi) set to demonstrate synergism.

We claim:

1. A thermoplastic polymer blend comprising (1) an EPDM polymer consisting essentially of interpolymerized units of about 67 percent to about 75 percent by weight of ethylene, about 15 percent to about 30 percent by weight of propylene, and from about 0.5 percent to about 10 percent by weight of an alkenyl norbornene monomer; said polymer having an ethylene length index of from about 2.8/1 to about 5/1, a melt endotherm value of about 1 to about 10 calories per gram, and a percent unstretched crystallinity of 0 percent to about 8 percent, and (2) from about 5 parts to about 200 parts by weight per 100 parts by weight of the EPDM polymer, of a polyethylene polymer, said blend containing no crosslinking or curing agents.

2. A thermoplastic polymer blend of claim 1 wherein the polyethylene polymer is present in from about 25 parts to about 150 parts by weight per 100 parts by weight of the polymer.

3. A thermoplastic polymer blend of claim 2 wherein the polyethylene polymer is a low density polyethylene polymer.

4. A thermoplastic polymer blend of claim 3 wherein the interpolymerized diene monomer in the EPDM polymer is ethylidene norbornene.

5. A thermoplastic polymer blend of claim 4 comprising (1) an EPDM polymer consisting essentially of interpolymerized units of about 69 percent by weight of ethylene, about 27 percent by weight of propylene, and about 4 percent by weight of 5-ethylidene-2-norbornene, and an ethylene length index of about 3.4 to 3.6, and (2) from about 25 parts to about 150 parts by weight per 100 parts by weight of the EPDM polymer, of a polyethylene polymer having a density of about 0.92 gram/cc.

6. A thermoplastic polymer blend of claim 4 comprising (1) an EPDM polymer consisting essentially of interpolymerized units of about 69 percent by weight of ethylene, about 23 percent by weight of propylene, and about 8 percent by weight of 5-ethylidene-2-norbornene, and an ethylene length index of about 2.8, and (2) from about 25 parts to about 150 parts by weight per 100 parts by weight of the EPDM polymer, of a polyethylene polymer having a density of about 0.92 gram/cc.

7. A thermoplastic polymer blend of claim 2 wherein the polyethylene polymer is a medium density polyethylene polymer.

* * * * *